Feb. 25, 1958  R. A. COLBY  2,824,452
SHAFT POSITIONING MECHANISM
Filed Dec. 6, 1955
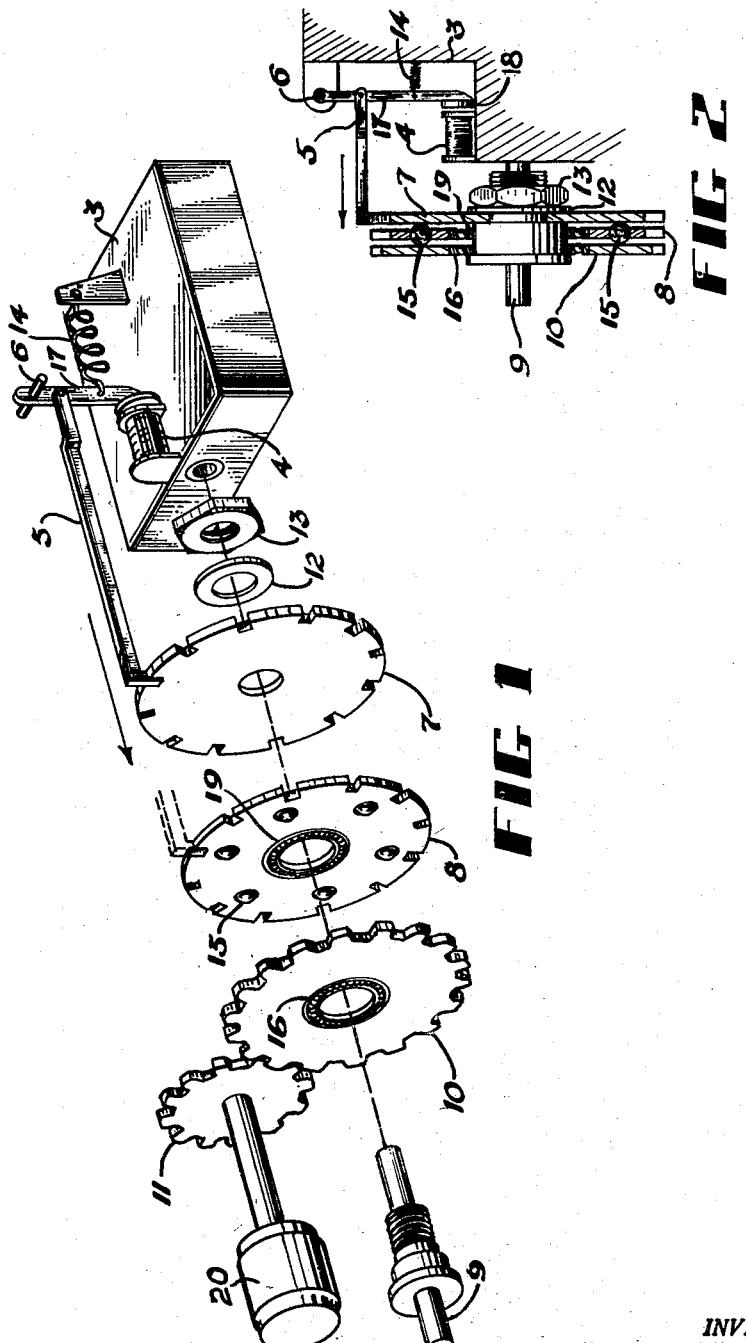
INVENTOR.
ROBERT A. COLBY
BY
ATTORNEYS United States Patent Office 2,824,452
Patented Feb. 25, 1958

2,824,452

SHAFT POSITIONING MECHANISM

Robert A. Colby, Marion, Iowa, assignor to Collins Radio Company, Cedar Rapids, Iowa, a corporation of Iowa Application December 6, 1955, Serial No. 551,244

4 Claims. (Cl. 74—10.2)

This invention relates to shaft positioning mechanisms and more particularly to such mechanisms employing incremental stops of a positive nature.

Many shaft positioning mechanisms have been designed and built which rotate shafts to fixed positions. Usually these fixed positions are specified increments of the periphery of the shaft to provide positive and accurate control. These shafts normally are used to rotate a tuning mechanism or an indicating mechanism which must be accurately positioned. Accurate positioning of the shaft is necessary because the tuning mechanism must be returned to the same position a number of times. One such apparatus which has been developed for tuning control of various types is found in Patent No. 2,476,673, issued to Richard W. May et al. on July 19, 1949.

The present invention provides a novel system for accurate and positive shaft positioning. This invention will positively position a shaft in any number of predetermined circumferential increments. This invention utilizes a gearless differential mechanism for driving and rotating the shaft when the position of the shaft is to be changed. The differential mechanism is controlled by a pawl arrangement in such a manner that the movement of the pawl engages the differential to drive the shaft. The pawl is controlled by a relay, which relay may be connected to any control system desired.

It is an object of this invention to provide a simplified shaft positioning system which is economical to construct. It is a further object of this invention to provide a shaft positioning mechanism which will conserve driving energy by requiring a driving force only when positioning the shaft into a load. It is a still further object of this invention to provide a shaft positioning mechanism which is simple in operation and yet provides extremely accurate shaft control in incremental steps.

It is another object of this invention to provide a shaft positioning mechanism with gearless differential driving means which is positively controlled by a pawl. It is yet another object of this invention to provide a shaft positioning mechanism wherein the positive control of the shaft position is determined by the operation of a pawl, which pawl is moved by a relay or solenoid. It is an object of this invention to provide a shaft positioning mechanism which is positive and accurate in its rotation of the shaft, and where the position may be selected by known control systems.

These and other objects of this invention will become apparent when the following description is read in conjunction with the accompanying drawing, in which:

Figure 1 is an exploded isometric view of the invention, and

Figure 2 is a sectionalized front view of the invention.

The shaft 9 may be connected to any mechanism the rotation of which it is desired to accurately and positively control. The accurate and positive positioning of the shaft 9 is accomplished in the following manner.

The actuating relay or solenoid 4 is located upon a fixed base 3. This fixed base may be an integral part of any system which shaft 9 is to rotationally control. The arm 17 has pivot arm 6 at one end and a plate or armature 18 at the opposite end from the pivot arm 6. The pawl 5 is pivoted by pivot arm 6 in such a manner that as the relay 4 is energized the plate 18 is attracted to the relay. The relay 4 must attract the plate 18 with a force sufficient to overcome the force exerted by spring 14. When plate 18 is attracted to the relay 4, the pawl 5 moves laterally from the stop plate 7 into the clutch plate 8. The pawl 5 is shown resting in stop plate 7 in Figures 1 and 2 with the arrows indicating the direction of movement and the dotted section indicating its resting position in the clutch plate 8. Stop plate 7 and clutch plate 8 have a selected number of detents or slots in their peripheries for the entry of pawl 5.

When relay 4 is de-energized the pawl 5 is resting in stop plate 7. In this condition, clutch plate 8 via bearing 19 is free to turn upon the shaft 9. With the clutch plate 8 turning freely on shaft 9, a relatively small force is required to rotate the turning or driving gears 10 and 11. Bearing 16 allows driving gear 10 to turn freely on shaft 9. Balls 15 are caged within clutch plate 8, free to rotate on their own centers and pre-loaded between face of gear 10 and face of stop plate 7. The gears 10 and 11 are continuously rotated at some selected speed by motor 20. If the control system now dictates that shaft 9 is to be repositioned, an electrical current energizes relay 4. Energization of relay 4 attracts plate 18 and forces pawl 5 into one of the slots on clutch plate 8. With the pawl in one of the notches of clutch plate 8, shaft 9 will be rotated by the friction of the ball bearings 15 caged within the clutch plate 8 rotating on their own centers. The rotation of the balls 15 on their own centers will frictionally drive the stop plate 7 and shaft 9 which is locked to stop plate 7 by thrust washer 12 and lock nut 13. When the control system determines that shaft 9 has rotated to its proper position, relay 4 will be de-energized. De-energization of relay 4 removes the force attracting plate 18 and spring 14 causes pawl 5 to return to a selected notch in the periphery of stop plate 7.

It is seen that by variation in the number of notches or slots in the peripheries of stop plate 7 and clutch plate 8, as many increments as desired may be provided. The driving force required is negligible except when the shaft 9 is being rotated under load. Thus, the over-all power requirements are minimized.

Although this invention has been described with respect to a particular embodiment thereof, it is not to be so limited as changes and modifications may be made therein which are within the full intended scope of the invention as defined by the appended claims.

What is claimed is:

1. A shaft positioning mechanism including a rotatable shaft, a motor, a plurality of gears including at least one gear positioned on and freely rotatable about said shaft, said motor rotating said freely rotatable gear, clutch means for selectively transmitting the rotary motion of said freely rotatable gear, a stop plate fixed to said rotatable shaft, a control mechanism including a positive stop means responsive to external signals to control the position of said positive stop means, said positive stop means selectively meshing with said stop plate and said clutch means, and said rotary motion selectively applied to said shaft by said stop plate thereby automatically positioning said shaft.

2. A shaft positioning mechanism including a rotatable shaft, a motor, a plurality of gears driven by said motor and including at least one gear which is positioned on and freely rotatable about said shaft by said motor, a clutch means for transmitting the energy from said freely rotatable gear, a stop plate connected to said rotatable shaft, a stop mechanism for selectively stopping said stop plate and said clutch means, a control means responsive to external signals to control position of said stop means, said stop plate rotated by said clutch means when said stop mechanism is meshed with said clutch means whereby said stop plate rotates said shaft.

3. A shaft positioning mechanism including a rotatable shaft, a motor, a plurality of gears including at least one gear positioned on and freely rotatable about said shaft, said freely rotatable gear constantly rotated by said motor, a clutch mechanism including a plate freely rotatable about said shaft and having a plurality of captive balls therein, a stop plate connected to said rotatable shaft, said stop plate and said clutch mechanism each having a plurality of notches in its periphery, a stop mechanism including control means responsive to external control signals, said stop mechanism meshed with the notches in the periphery of the stop plate when certain external signals are applied to the control means, thereby retaining said shaft in its position, and said stop mechanism meshed with the notches in the periphery of said clutch mechanism when said control means receives positioning signals whereby said stop plate is driven by said clutch mechanism to positively position said rotatable shaft to correspond to said positioning signals.

4. A shaft positioning mechanism including a rotatable shaft, a motor, a plurality of gears including at least one gear concentrically disposed and freely rotatable about said shaft, said freely rotatable gear constantly rotated by said motor, a clutch mechanism including a plate freely rotatable about said shaft and having a plurality of captive balls therein, a stop plate connected to said rotatable shaft, said stop plate and said clutch mechanism each having a plurality of notches in its periphery, a stop mechanism including control means responsive to external control signals, said stop mechanism meshed with the notches in the periphery of the stop plate when certain signals are applied to the control means, said stop mechanism meshed with the notches in the periphery of said clutch mechanism when said control means receives certain other signals whereby said stop plate is driven by the rotation of said captive balls about their own centers in said clutch mechanism to rotate said shaft.

No references cited.